US010198861B2

(12) United States Patent
Anderson et al.

(10) Patent No.: US 10,198,861 B2
(45) Date of Patent: Feb. 5, 2019

(54) USER INTERACTIVE CONTROLS FOR A PRIORI PATH NAVIGATION IN VIRTUAL ENVIRONMENT

(71) Applicant: Intel Corporation, Santa Clara, CA (US)

(72) Inventors: Glen J. Anderson, Beaverton, OR (US); Meng Shi, Hillsboro, OR (US); Reese Bowes, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/086,574

(22) Filed: Mar. 31, 2016

(65) Prior Publication Data
US 2017/0287214 A1    Oct. 5, 2017

(51) Int. Cl.
*G06T 19/00* (2011.01)
*G06T 13/40* (2011.01)
*G06F 3/01* (2006.01)

(52) U.S. Cl.
CPC ............ *G06T 19/003* (2013.01); *G06F 3/011* (2013.01); *G06T 13/40* (2013.01); *G06T 19/006* (2013.01)

(58) Field of Classification Search
None
See application file for complete search history.

(56) References Cited

U.S. PATENT DOCUMENTS

| 8,880,336 B2* | 11/2014 | van Os | G01C 21/3635 345/173 |
| 2006/0114251 A1* | 6/2006 | Miller | G06T 15/205 345/419 |
| 2007/0035563 A1* | 2/2007 | Biocca | G06F 3/014 345/633 |
| 2010/0045703 A1 | 2/2010 | Kornmann et al. | |
| 2010/0194602 A1* | 8/2010 | Engels | G01C 23/00 340/979 |
| 2010/0245257 A1* | 9/2010 | Cragun | G06F 3/011 345/173 |
| 2011/0310088 A1* | 12/2011 | Adabala | G06T 19/003 345/419 |
| 2012/0099804 A1* | 4/2012 | Aguilera | G06F 17/30873 382/285 |
| 2013/0050206 A1* | 2/2013 | Willis | G06F 1/1637 345/419 |

(Continued)

OTHER PUBLICATIONS

Shenchang Eric Chen, An Image-Based Approach to Virtual Environment Navigation, 1995.*

(Continued)

*Primary Examiner* — Hilina K Demeter
(74) *Attorney, Agent, or Firm* — Schwegman Lundberg & Woessner, P.A.

(57) ABSTRACT

Navigation in a virtual environment (VE) is facilitated by the creation and traversal of a 3D navigation path. A computing platform renders perspective-view imagery (PVI) of portions of the VE for display on a display device. User interactive input (UII) is read, and interaction with the VE is effected via the UII. A 3D navigation path is formed in the VE based on the UII interactive with the PVI. Thereafter, virtual movement is effected along the 3D navigation path while the viewing direction of the PVI is varied based on the UII.

25 Claims, 10 Drawing Sheets

(56) References Cited

U.S. PATENT DOCUMENTS

| | | | |
|---|---|---|---|
| 2013/0345962 A1* | 12/2013 | van Os | G01C 21/3632 |
| | | | 701/412 |
| 2014/0006966 A1 | 1/2014 | Geraci et al. | |
| 2014/0225918 A1 | 8/2014 | Mittal et al. | |
| 2014/0320674 A1* | 10/2014 | Kuang | H04N 5/23222 |
| | | | 348/207.1 |
| 2015/0116358 A1* | 4/2015 | Choi | G06T 9/00 |
| | | | 345/633 |
| 2015/0138065 A1 | 5/2015 | Alfieri | |
| 2016/0033768 A1 | 2/2016 | Pedrotti et al. | |
| 2016/0155260 A1* | 6/2016 | Jenkins | G06T 15/20 |
| | | | 345/419 |
| 2016/0239181 A1* | 8/2016 | You | G06F 3/04815 |

OTHER PUBLICATIONS

"International Application Serial No. PCT/US2017/019922, International Search Report dated May 24, 2017", 3 pgs.

"International Application Serial No. PCT/US2017/019922, Written Opinion dated May 24, 2017", 9 pgs.

Lang, Ben, "Don't get too hyped on the possibility of seeing [VR input] at GDC", Oculus Rift Creator, [Online]. [Accessed Sep. 20, 2017]. Retrieved from the Internet: <URL: https://www.roadtovr.com/oculus-rift-creator-dont-get-hyped-possibility-seeing-vr-input-gdc-2015/>, (Feb. 23, 2015), 4 pgs.

Ragan, Eric D., et al., "The effects of navigational control and environmental detail on learning in 3D virtual environments", Virtual Reality Short Papers and Posters (VRW), 2012 IEEE, (2012), 11-14.

* cited by examiner

USER INTERACTIVE CONTROLS FOR A PRIORI PATH NAVIGATION IN VIRTUAL ENVIRONMENT

TECHNICAL FIELD

Embodiments described herein generally relate to information processing and user interfaces and, more particularly, to virtual-reality (VR) systems and methods.

BACKGROUND

Virtual reality (VR) systems provide an immersive experience for a user by simulating the user's presence in a computer-modeled environment, and facilitating user interaction with that environment. In typical VR implementations, the user wears a head-mounted display (HMD) that provides a stereoscopic display of the virtual environment. Some systems include sensors that track the user's head movement and hands, allowing the viewing direction to be varied in a natural way when the user turns their head about, and for the hands to provide input and, in some cases, be represented in the VR space. The latter allows the user to see a representation of the hands while grasping objects controlling movement within the virtual environment. Other conventional VR systems provide other types of input devices, such as specialized gloves or hand-held controllers fitted with accelerometers and other sensing devices, such as pressure-sensitive pads, joystick, trackball, or the like. More basic input devices may include gaming controllers keyboards, mice, or the like.

One challenge faced by VR system designers is providing a way for users to control their virtual movement within the virtual environment, while also providing a way for users to observe, and interact with, objects in the virtual environment, in a natural fashion. Oftentimes, the same user-input controls are used for both purposes, which makes interaction with the virtual environment unnatural for the user.

Conventional approaches to facilitating navigation in virtual environments include a "fly-through" approach in which the user controls velocity or accelerations of their movement thorough the virtual space, or a "select-and-zoom approach in which the user is provided a way to "grab" a point in the virtual environment and drag that point to vary the user's virtual position within the environment. Various control inputs, such as hand-gestures may be used to zoom the user's perspective inwards and outwards. A camera-in-hand approach to control the user's point-of-view may be used to navigate, in which the user may move the point of view as though a camera is in their hand. Another approach to navigation, macro navigation, involves changing the user's view of the virtual environment from an immersive perspective view to a top view or bird's eye view from a relatively high elevation, to display a map or aerial viewing mode in which the user may reposition their virtual location.

These, and other, approaches to navigation tend to be unnatural, inefficient, and disruptive to the immersive user experience that is sought after by VR system designers and users, since the user has to interrupt their interaction with the virtual environment to command movement, or vice-versa.

For these, and other, reasons, a practical solution is needed to support navigation and environment-interactivity in a virtual-reality environment.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to a virtual reality (VR) processing system that provides its user an interface with which to navigate within the 3D virtual environment (VE) while at the same time interactively exploring the VE. In one type of embodiment, the interactive exploration is facilitated by providing the user with a graphical user interface (GUI) engine that provides interactive controls for defining an a priori 3D navigation path. The 3D navigation path is deemed a priori in such embodiments because the path is formed in the VE before it may be traversed. Once the navigation path is defined, the user may virtually traverse the path using relatively simple movement-related controls. The simplicity of the movement controls allow the user to more naturally explore the VE by taking such actions as changing the viewing direction (e.g., looking around), interacting with virtual objects, etc., using interactive input to the system, while moving along the navigation path, without having to constantly adjust the direction of movement so long as the user wishes to remain on the defined navigation path.

Aspects of the embodiments may be implemented as part of a computing platform. The computing platform may be one physical machine, or may be distributed among multiple physical machines, such as by role or function, or by process thread in the case of a cloud computing distributed model. In various embodiments, aspects of the invention may be configured to run in virtual machines that in turn are executed on one or more physical machines. For example, the computing platform may include a processor-based system located on a head-mounted display (HMD) device, it may include a stand-alone computing device such as a personal computer, smartphone, tablet, remote server, etc., or it may include some combination of these. It will be understood by persons of skill in the art that features of the invention may be realized by a variety of different suitable machine implementations.

Figure 1:
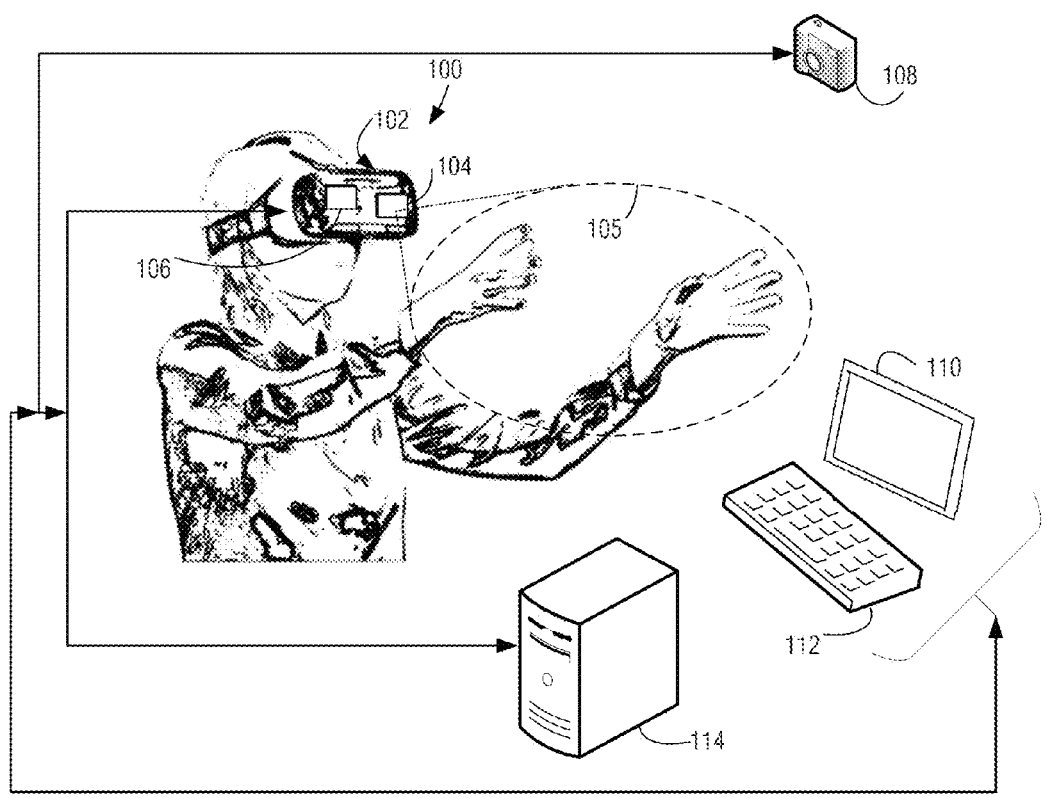
FIG. 1 is a high-level system diagram illustrating some examples of components of a VR system that may employ aspects of the embodiments.

FIG. 1 is a high-level system diagram illustrating some examples of hardware components of a VR system that may be employed according to some aspects of the embodiments. HMD device 100 to be worn by the user includes display 102 facing the user's eyes. In various embodiments, display 102 may include stereoscopic, autostereoscopic, or virtually 3D display technologies. In a related embodiment, the HMD device may have another form factor, such as smart glasses, that offer a semi-transparent display surface. In the embodiment depicted, HMD device 100 may include a set of sensors 104, such as motion sensors to detect head movement, eye-movement sensors, and hand-movement sensors to monitor motion of the user's arms and hands in zone 105. Other sensors 104 may include a voice-input sensor, touch-input sensor, brain-computer interface (BCI), or the like.

HMD device 100 also includes a processor-based computing platform 106 that is interfaced with display 102 and sensors 104, and configured to perform a variety of data-processing operations that may include interpretation of sensed inputs, virtual-environment modeling, graphics rendering, user-interface hosting, other output generation (e.g., sound, haptic feedback, etc.), data communications with external or remote devices, user-access control and other security functionality, or some portion of these, and other, data-processing operations.

The VR system may also include external physical-environment sensors that are separate from HMD device 100. For instance, camera 108 may be configured to monitor the user's body movements including limbs, head, overall location within the user's physical space, and the like. Touchscreen 110 may be used to accept user input, and provide some visual output for the user as well. Input device 112, may be a keyboard, as depicted, but may also have a different form factor, such as a gaming controller, mouse, trackpad, trackball, sensing glove, and the like. The external physical-environment sensors may be interfaced with HMD system 100 via a local-area network, personal-area network, or interfaced via device-to-device interconnection. In a related embodiment, the external physical-environment sensors may be interfaced via external computing platform 114.

External computing platform 114 may be situated locally (e.g., on a local area network, personal-area network, or interfaced via device-to-device interconnection) with HMD device 100. In a related embodiment, external computing platform 114 may be situated remotely from HMD device 100 and interfaced via a wide-area network such as the Internet. External computing platform 114 may be implemented via a server, a personal computer system, a mobile device such as a smartphone, tablet, or some other suitable computing platform. In one type of embodiment, external computing platform 114 performs some or all of the functionality of computing platform 106 described above, depending on the computational capabilities of computing platform 106. Data processing may be distributed between computing platform 106 and external computing platform 114 in any suitable manner. For instance, more computationally-intensive tasks, such as graphics rendering, user-input interpretation, 3-D virtual environment modeling, and the like, may be allocated to external computing platform 114. Regardless of whether, and in what manner, the various VR system functionality is distributed among one or more computing platforms, all of the (one or more) computing platforms may collectively be regarded as sub-parts of a single overall computing platform in one type of embodiment, provided of course that there is a data communication facility that allows the sub-parts to exchange information.

Figure 2:
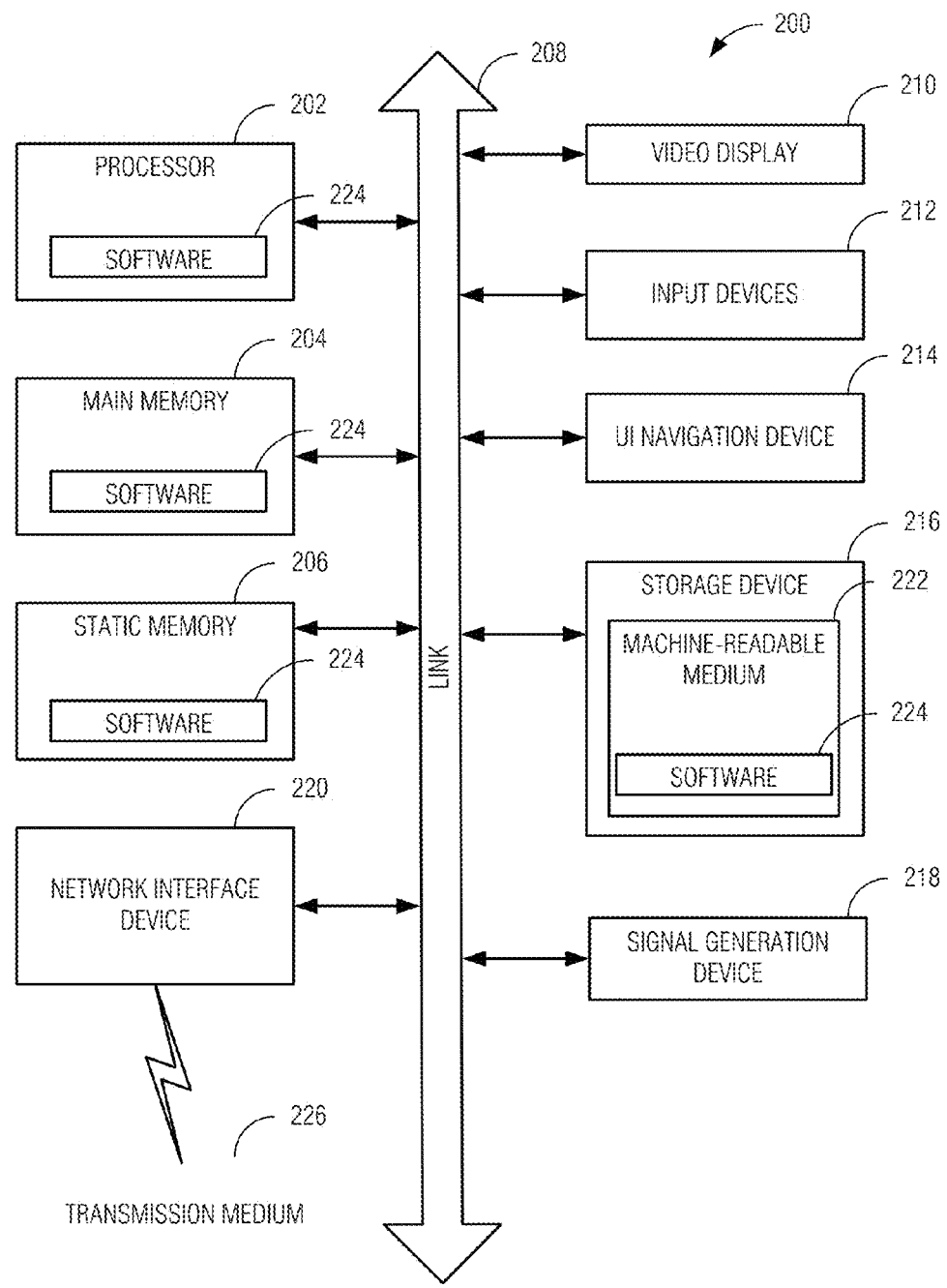
FIG. 2 is a block diagram illustrating an exemplary system architecture of a processor-based computing device according to an embodiment.

FIG. 2 is a block diagram illustrating a computing platform in the example form of a general-purpose machine. In certain embodiments, programming of the computing platform 200 according to one or more particular algorithms produces a special-purpose machine upon execution of that programming In a networked deployment, the computing platform 200 may operate in the capacity of either a server or a client machine in server-client network environments, or it may act as a peer machine in peer-to-peer (or distributed) network environments. Computing platform 200, or some portions thereof, may represent an example architecture of computing platform 106 or external computing platform 114 according to one type of embodiment.

Example computing platform 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computing platform 200 may further include a video display unit 210, input devices 212 (e.g., a keyboard, camera, microphone), and a user interface (UI) navigation device 214 (e.g., mouse, touchscreen). The computing platform 200 may additionally include a storage device 216 (e.g., a drive unit), a signal generation device 218 (e.g., a speaker), and a network interface device (NID) 220.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computing platform 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
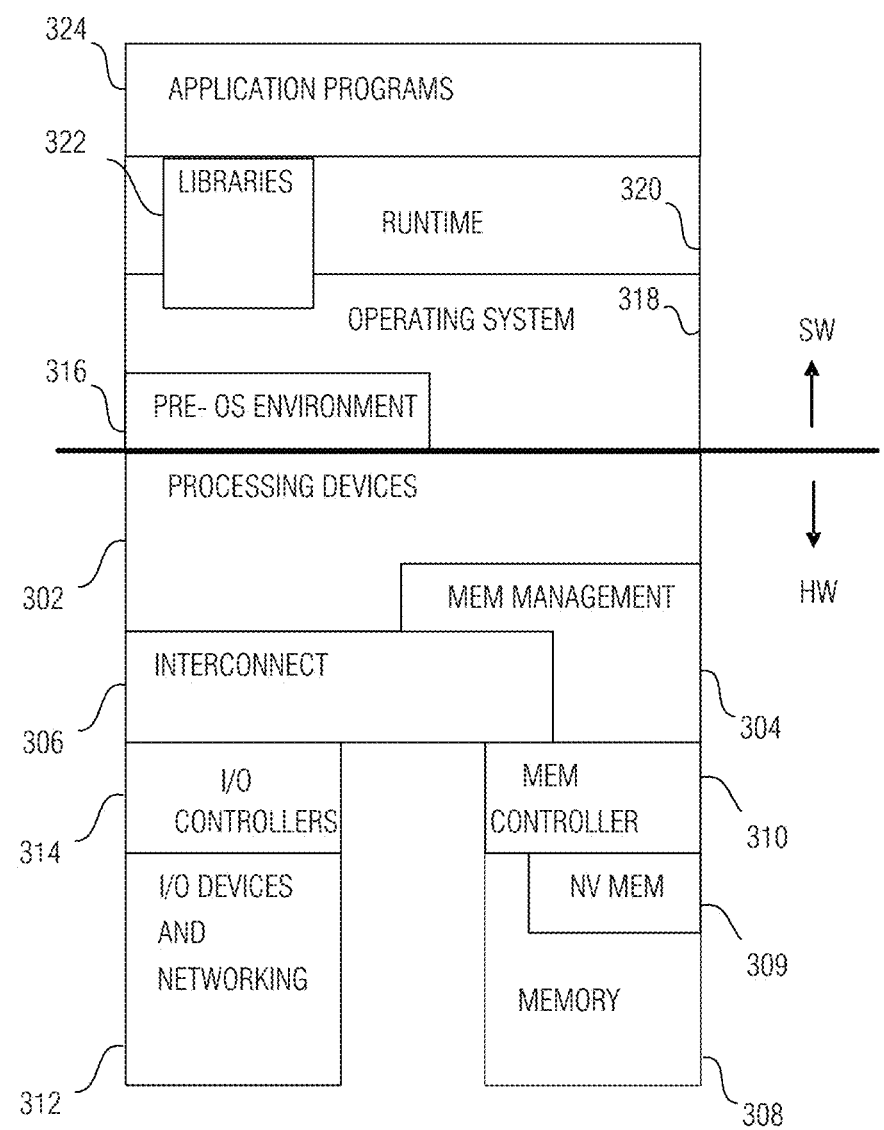
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in one type of embodiment. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) engine that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
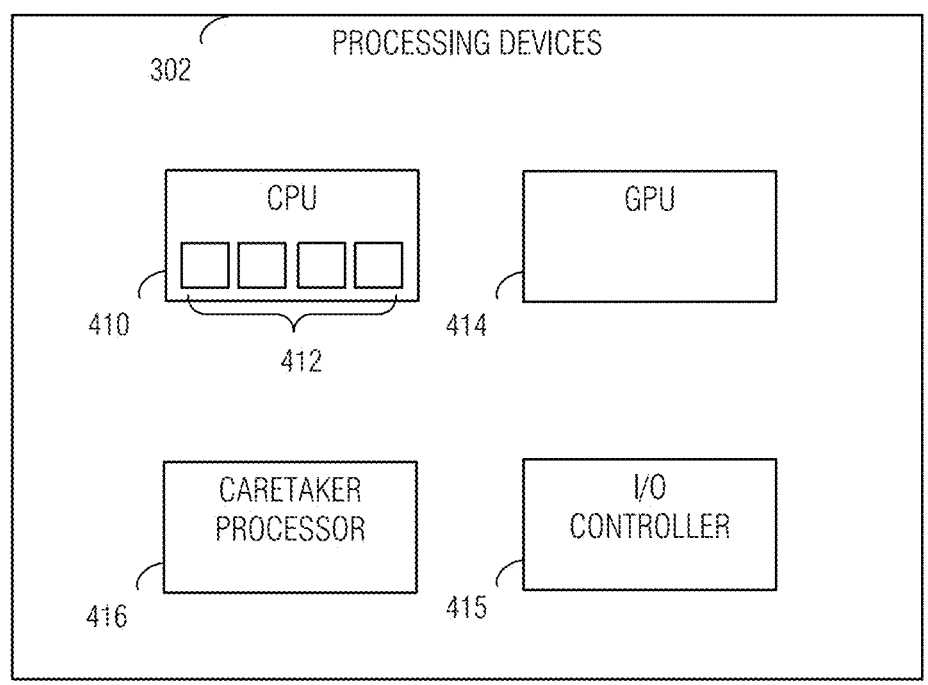
FIG. 4 is a block diagram illustrating examples of processing devices that may be implemented on a computing platform, such as the computing platform described with reference to FIGS. 2-3, according to an embodiment.

FIG. 4 is a block diagram illustrating processing devices 302 according to one type of embodiment. One, or a combination, of these devices may constitute processor 120 in one type of embodiment. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be a x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 may also include caretaker processor 416 in one type of embodiment. Caretaker processor 416 generally does not participate in the processing work to carry out software code as CPU 410 and GPU 414 do. In one type of embodiment, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computing platform. In one type of embodiment, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 415 coordinates information flow between the various processing devices 410, 414, 416, as well as with external circuitry, such as a system interconnect.

Examples, as described herein, may include, or may operate on, logic or a number of components, engines, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

Figure 5:
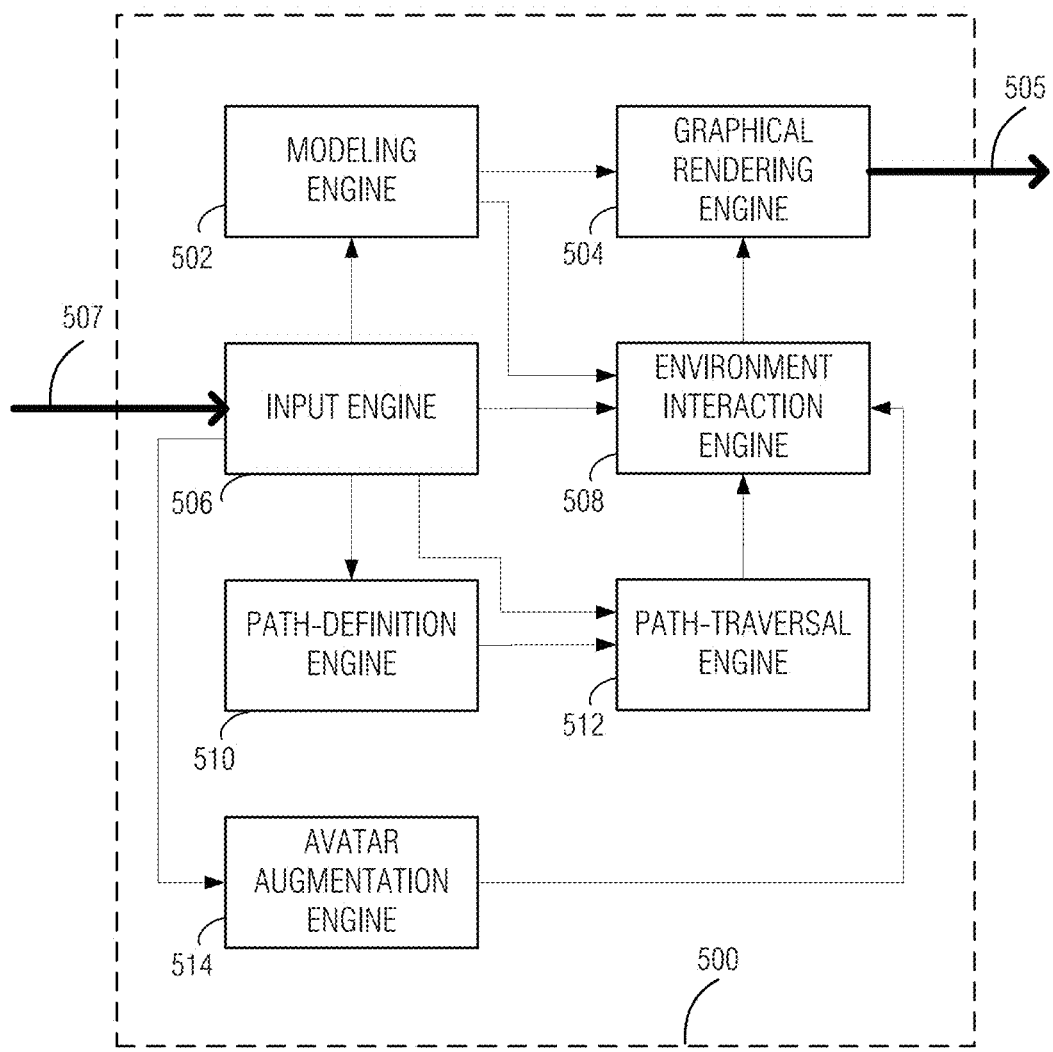
FIG. 5 is a block diagram illustrating various engines that may be implemented on a computing platform, according to an embodiment.

FIG. 5 is a block diagram illustrating various engines that may be implemented on a computing platform, according to one type of embodiment. As depicted, computing platform 500 includes modeling engine 502, which is constructed, programmed, or otherwise configured, to model a 3D virtual environment (VE), including virtual objects, structures, forces, and laws of physics, that may be specific to the particular 3D VE. Graphical rendering engine 504 is constructed, programmed, or otherwise configured, to render perspective-view imagery of parts of the VE, such as from the user's vantage point, and provides the perspective-view imagery output 505 to a display output interface which, in turn, is coupled to a HMD device or other suitable display on which the user views the VE.

Input engine 506 is constructed, programmed, or otherwise configured, to accept user-interactive input (UII) 507 from the user of the VR system. UII 507 may include head movement, hand or other limb movement, body repositioning, voice commands, key presses, touchscreen input, eye movement, neural signaling of the user, or any other suitable user input that is sensed by one or more system-provided sensing devices.

Environment interaction engine 508 is constructed, programmed, or otherwise configured, to interpret the UII, and effect user interaction with the VE based on the UII 507. User interaction with the VE may include simply changing viewing angles, such as in response to head movement, for instance. The user interaction with the VE may also include manipulation of objects, and movement in the VE. In one type of embodiment, the user interaction with the VE may include movement of an avatar. In the present context, an avatar is a virtual representation of the user, or some portion of the user, such as an arm, a hand, a head, a torso, or some other graphically-depicted object, person, animal, mechanism, etc., that represents the user.

Path-definition engine 510 is constructed, programmed, or otherwise configured, to form a 3D navigation path in the VE based on the UII 507. A 3D navigation path is a path along which the user's virtual position within the VE may be moved using simplified (e.g., one-dimensional) motion controls. In a related embodiment, the path-definition engine 510 facilitates creation of the 3D navigation path by the user, while the user is viewing the VE using the perspective-view imagery displayed to the user. In another related embodiment, creation of the 3D navigation path is achieved via UII 507 obtained via input engine 506.

Figure 6:
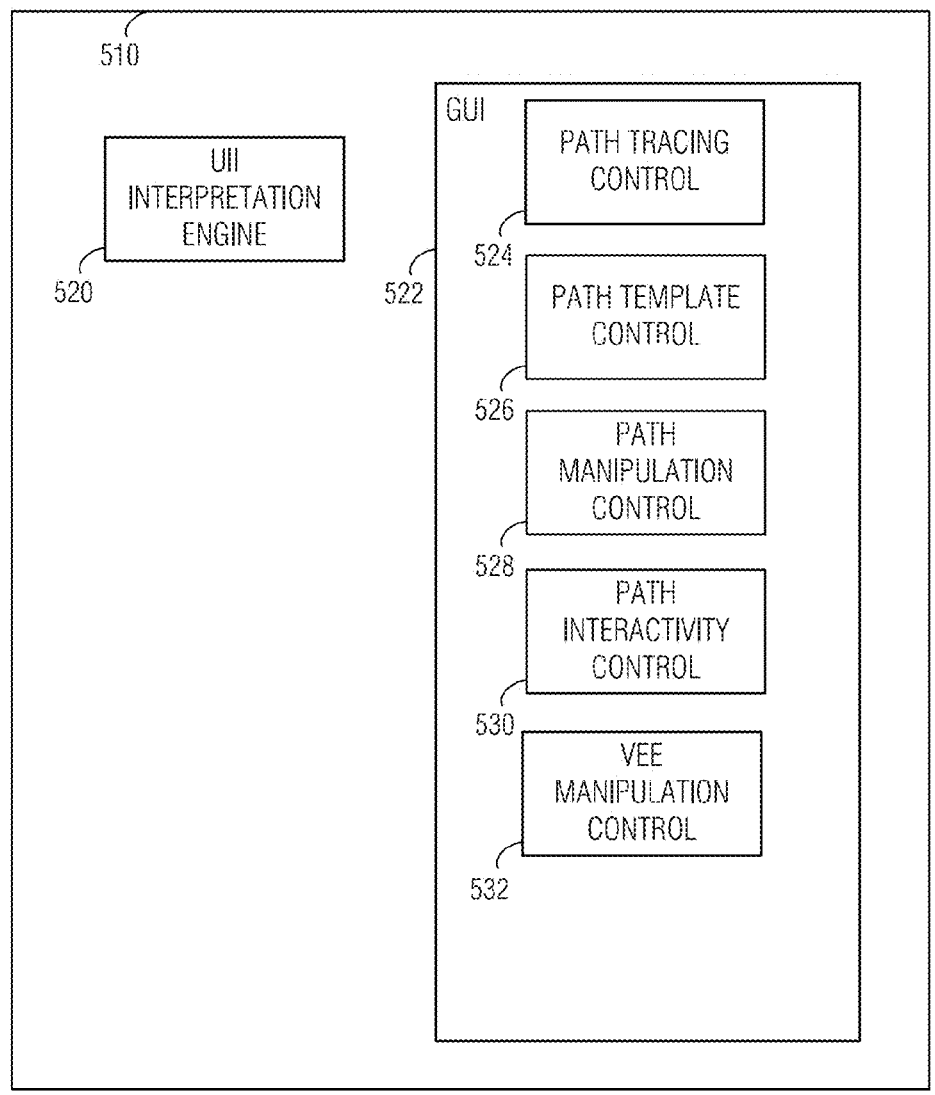
FIG. 6 is a block diagram illustrating component engines of a path-definition engine according to an embodiment.

FIG. 6 is a block diagram illustrating component engines of path-definition engine 510 according to one type of embodiment. Path-definition engine 510 may include a UII interpretation engine 520 that is constructed, programmed, or otherwise configured, to recognize certain inputs that are relevant to the creation and manipulation of a 3D navigation path. Such inputs may include hand-gestures, voice-commands, sequences of keypresses, etc., received as UII. Certain UII may establish a path-definition mode that is responsive to certain other UII in order to interactively define a 3D navigation path.

In an embodiment, path-definition engine 510 further includes a graphical user interface (GUI) engine engine 522 that is constructed, programmed, or otherwise configured, to facilitate an interactive path-drawing tool via the UII 507 and perspective-view imagery (PVI).

In an embodiment, path-definition engine 510 provides an interactive path-tracing control 524 implemented via GUI engine 522 that draws a path based on a trajectory of a virtual projectile launched in a specified direction via the UII and the PVI. In an example embodiment, the navigation path that is formed from operation of path-tracing control 524 is a straight line from the launching point (generally, the user's virtual position in the VE), in a target direction, or to a target point, which may be a virtual structure, topographic feature, or other object. In a related embodiment, the navigation path produced by operation of path-tracing control 524 is interactive with the VE. In an example, the navigation path, once established as a straight line from the launch point to a target point, snaps to conform to the VE's topography that exists between the launch and target points. In another example of the navigation path being interactive with the VE, the navigation path may be automatically adjusted in response to features structural or topographic features or other objects of the VE that are situated in the navigation path. For instance, the navigation path may be re-routed to circumvent a tree or building that is situated between the launch and target points.

In a related embodiment, path-definition engine 510 provides an interactive path template control 526 implemented via GUI engine 522, which operates to provide the user with a plurality of pre-defined path templates for selection via the UII. In one such example, the various path templates include linear, curvilinear, polylinear, and various other shapes, such as helixes, polygon sections, and the like, are offered for selection by user via GUI engine 522, which is responsive to the UII.

In one type of embodiment, path manipulation control 528 is provided by GUI engine 522. Path manipulation control operates to allow the user to stretch, bend, reposition, shrink, scale, and otherwise modify an initially-placed navigation path in an interactive manner via UII. In a related embodiment, path manipulation control 528 includes drawing tools that facilitate creation of a navigation path in the first instance.

In another related embodiment, path interactivity control 530 is provided by GUI engine 522. Path interactivity control 530 permits the user to control, via UII, whether, and how, a particular navigation path, while being defined, is to interact with virtual features of the VE. For instance, the 3D navigation path may be subject to the force of gravity, as modeled in the VE. Likewise, the 3D navigation path may be selectively responsive to solid objects, topography, wind, and the like, as modeled in the VE. Path interactivity control 530 may include an option for setting the type of navigation path interactivity with the VE for purposes of path formation, path traversal, or both.

In one type of embodiment, multiple distinct navigation paths may be created via the UII. The different navigation paths may be created using a variety of path-creation techniques, as supported by path-definition engine 510.

In another related embodiment, VEE manipulation control 532 is provided by GUI ENGINE 522. VEE manipulation control 532 may allow the user, via the UII, to virtually affix bindings to points in the VE and to subsequently use those binds to pull, push, turn, zoom, etc., the VE. This feature may be useful, for instance, in creating navigation paths that have certain shapes or features at large distances from the user's current virtual position in the VEE. In a related embodiment, the view of the VEE during formation of the navigation paths remains a perspective view, even if the vantage point is varied.

Returning to FIG. 5, computing platform 500 may further include path-traversal engine 512 according to a type of embodiment, which is constructed, programmed, or otherwise configured, to effect virtual movement along the 3D navigation path while concurrently varying viewing direction of the PVI based on the UII.

Figure 7:
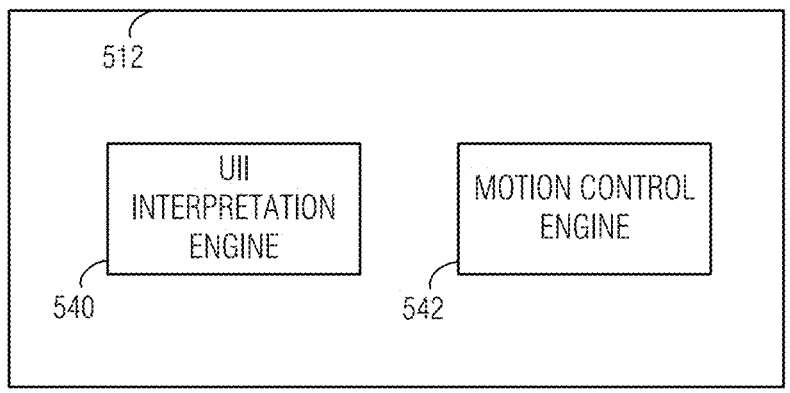
FIG. 7 is a block diagram illustrating example components of path-traversal engine according to a type of embodiment.

FIG. 7 is a block diagram illustrating example components of path-traversal engine 512 according to a type of embodiment. As depicted, path-traversal engine 512 includes UII interpretation engine 540, which is constructed, programmed, or otherwise configured, to recognize certain inputs that are relevant to motion along one or more created navigation paths. These inputs may include certain gestures or other body movements, keypresses, swipes, eye movements, etc., that are received as UII.

Notably, in one type of embodiment, the UII recognized by interpretation engine 540 as being relevant to motion along a navigation path, is distinct from other UII that is relevant to otherwise interacting with the VE, including varying the perspective view direction, interacting with virtual objects, etc., such as UII that is recognized, and responded to by environment interaction engine 508. Thus, in related embodiments, navigation motion control and VE interaction and interactive exploration, may be performed concurrently.

In a related embodiment, motion control UII for movement along a navigation path is associated with a particular set of at least one input device, whereas UII for otherwise interacting with the VE is associated with different set of at least one other input device. For instance, motion control UII may be associated with an eye-movement sensor, while perspective view direction may be associated with a head-movement sensor, and virtual object interactions may be associated with a hand-movement sensor.

In another embodiment, motion control UII for movement along a navigation path is associated with certain gestures, such as a pointed index finger, for instance.

Motion control engine 542 provides a set of controls that are applicable to movement along one or more navigation paths. Examples of motion controls include the following:

Stop
Forward motion
Reverse motion
Increase speed
Reduce speed
Jump to next navigation path
Jump to previous navigation path In a related embodiment, the controls for movement along a navigation path are limited to one-dimensional control. Thus, in this embodiment, the direction of motion is not controllable via motion control engine 542 for a given navigation path. In a related embodiment, the navigation path remains fixed in its shape and position in the VE while the virtual user is traversing that path. In a related embodiment, the shape and position remain fixed even though some other movement parameter may be interactively varied, such as forward/reverse motion, speed, etc.

In a related embodiment, the jump to next/previous navigation path controls may provide some added dimensionality of control, but it is limited to selection from among the various predefined navigation paths according to a type of embodiment.

Referring again to FIG. 5, avatar augmentation engine 514 is constructed, programmed, or otherwise configured, to model at least one portion of a user in the VE to produce at least one avatar that is interactive with virtual objects in the VE and is movable in the VE along navigation paths in response to UII. In a related embodiment, the avatar augmentation engine may distort a shape of an avatar in response to the UII.

An avatar may include one or more arms, hands, or the like. In an embodiment, distortion of the shape of the avatar may include stretching the length of the avatar. For instance, where the avatar is a virtual limb, the limb may be stretched to some multiple of its initial length, in response to certain UII. This functionality may be useful for reaching distant objects or structures, for example. Accordingly, in one embodiment, avatar augmentation engine 514 operates in conjunction with environment interaction engine 508 to facilitate interaction with virtual objects using an augmented avatar.

Avatar augmentation engine 514 may also be used for forming a navigation path. For instance, an end of a navigation path may be placed at some distant point using a stretched avatar-hand. Accordingly, in this embodiment, avatar augmentation engine 514 operates in conjunction with path-definition engine 510 to facilitate path placement and path shape manipulation.

Figure 8:
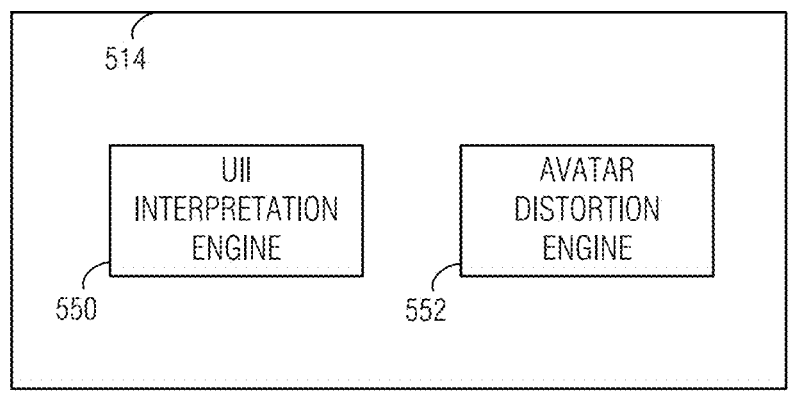
FIG. 8 is a block diagram illustrating components of an avatar augmentation engine according to a type of embodiment.

FIG. 8 is a block diagram illustrating components of avatar augmentation engine 514 according to a type of embodiment. As depicted, avatar augmentation engine 514 includes UII interpretation engine 550, which is constructed, programmed, or otherwise configured, to recognize certain inputs that are relevant to distortion of an avatar. These inputs may include certain gestures or other body movements, keypresses, swipes, eye movements, etc., that are received as UII. Notably, these inputs are distinct from other UII for changing perspective viewing direction or manipulating objects in the VE.

Avatar distortion engine implements changes to the avatar based on the relevant UII. Examples of distortions include, lengthening a limb, shortening a limb, magnifying movement-to-input ratio for an avatar, reducing the movement-to-input ratio for an avatar, bending or curving an avatar, resetting an avatar to its default shape, and binding/releasing the avatar from some object or point in the VE.

Figure 9A:
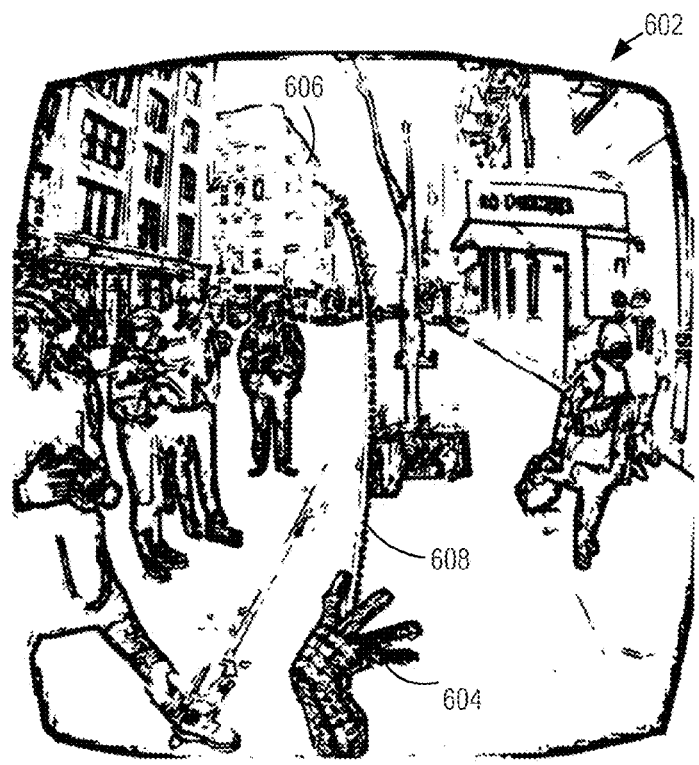
FIGS. 9A-9C are diagrams that illustrate various example virtual environments and user interfaces in which certain features according to some embodiments are utilized.
Figure 9B:
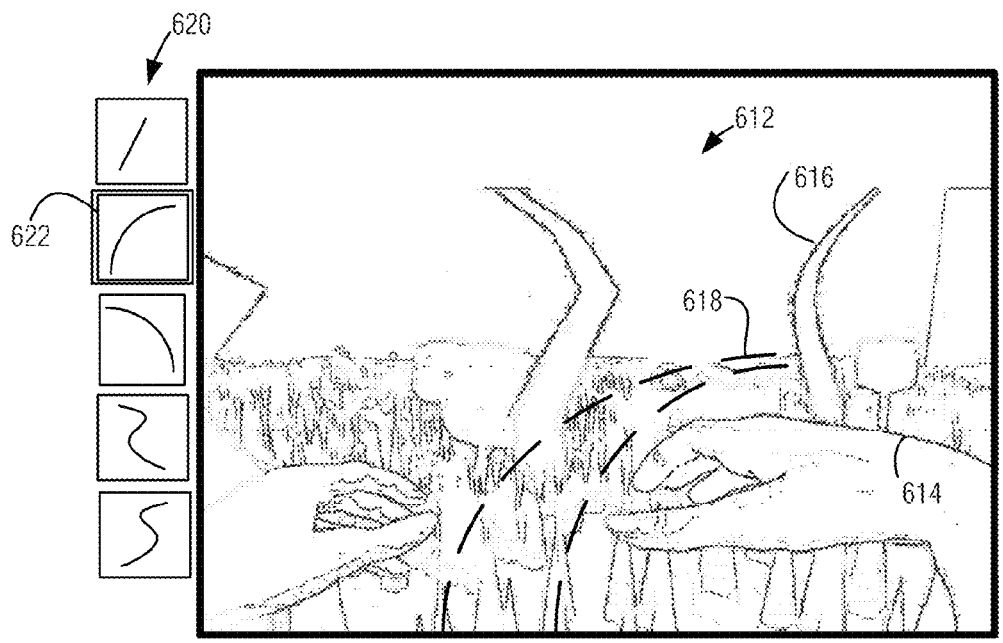
Figure 9C:
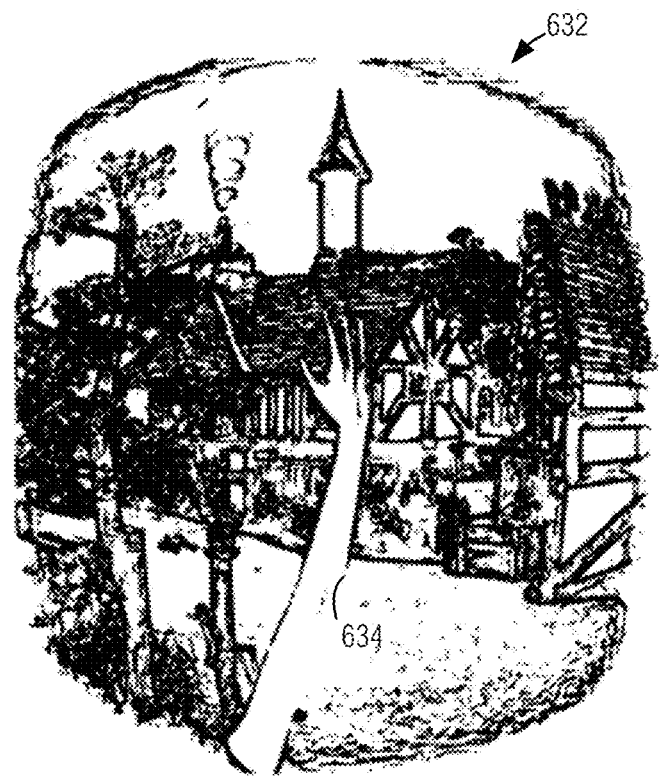

FIGS. 9A-9C are diagrams that illustrate various example virtual environments and user interfaces in which certain features according to some embodiments are utilized. FIG. 9A illustrates a perspective view 602 of a VE, in which a user's avatar 604 is depicted as a hand. A distant surface 606 is selected as a target point for navigation path creation. A projectile-launch technique is utilized to direct navigation path 608 to the target point on surface 606. Notably, the navigation path creation in this example interacts with virtual objects in this VE.

FIG. 9B is a diagram illustrating VE 612, in which avatar 614 is shown as a pair of hands. A distant object 616 is selected as a destination point for navigation path 618, which is shown in dashed lines. In this example, a navigation path template palette 620 is displayed in a GUI ENGINE, from which right-curved path template 622 is selected. The GUI ENGINE facilitates manipulation of the basic path template to adjust the path's virtual length, shape, etc., so that the path may lead to the desired destination.

FIG. 9C is a diagram illustrating VE 632, in which user avatar 634 is displayed. In this example, avatar 634 is an arm, which is distorted length-wise to give the user the ability to reach to, and interact with, distant objects, such as the building shown in this example. In a related embodiment, a distorted avatar may be used to lay down a navigation path in VE 632.

Figure 10:
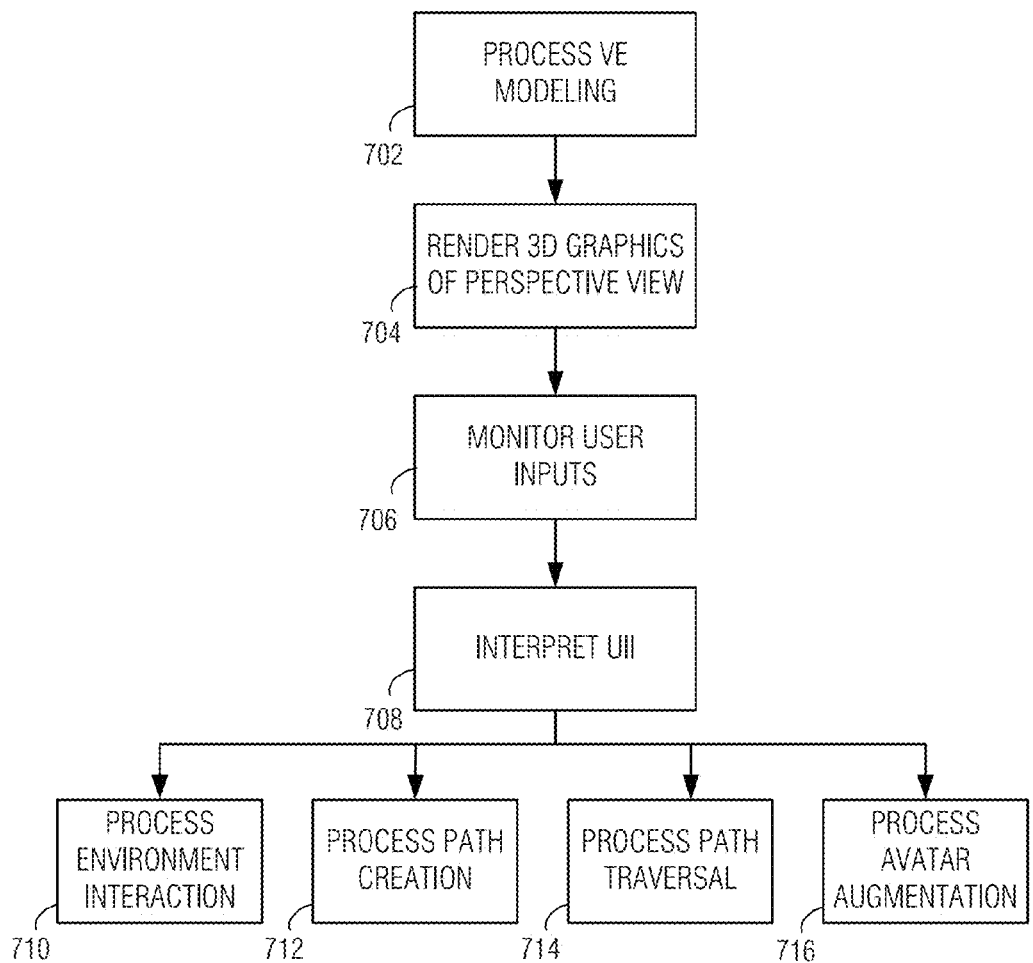
FIG. 10 is a flow diagram illustrating example processing operations according to an embodiment.

FIG. 10 is a flow diagram illustrating example processing operations according to an embodiment. It is important to note that the example process is a richly-featured embodiment that may be realized as described; in addition, portions of the process may be implemented while others are excluded in various embodiments. The following Additional Notes and Examples section details various combinations, without limitation, that are contemplated. It should also be noted that in various embodiments, certain process operations may be performed in a different ordering than depicted, provided that the logical flow and integrity of the process is not disrupted in substance.

The processing operations may be carried out by a computing platform, such as one, or a combination, of those described above. At 702, modeling engine 502 models the VE, including the virtual objects, topography, structures, and other environmental variables such as wind, gravity, and the like. At 704, the graphical rendering engine 504 renders 3D graphics of the user's perspective view of the VE. At 706, the input engine 506 monitors user inputs, such as one or more of the examples described above (e.g., head movement, eye movement, hand/limb movement, body movement, voice commands, input-device actuations, etc.). These detected inputs, referred to herein as user-interactive input (UII), are interpreted at 708 by each of the environment interaction engine 508, path-definition engine 510, path-traversal engine 512, and avatar augmentation engine 514, to determine their purpose. The inputs may be directed to interaction with the VE, path creation, path traversal, or avatar augmentation, for example. Accordingly, based on the interpreted UII, processing operations 710, 712, 714, and 716 corresponding to the UII purpose are performed. Notably, path traversal processing at 714 may be carried out simultaneously with one or more of the VE interaction processing at 710, and avatar augmentation processing at 716, by virtue of the navigation path having been previously created.

Additional Notes & Examples

Example 1 is a method for providing virtual-reality navigation controls utilizing a computing platform, the method comprising: modeling, by the computing platform, a three-dimensional virtual environment; rendering, by the computing platform, perspective-view imagery of portions of the virtual environment for display on a display device; reading, by the computing platform, user interactive input; updating the modeling, by the computing platform, to effect interaction with the virtual environment via the user interactive input; forming, by the computing platform, an a priori three-dimensional navigation path in the virtual environment based on the user interactive input interactive with the perspective-view imagery; and updating the modeling, by the computing platform, to effect virtual movement along the three-dimensional navigation path while concurrently varying viewing direction of the perspective-view imagery based on the user interactive input.

In Example 2, the subject matter of Example 1 optionally includes providing, via the computing platform, an interactive path-drawing tool via the user interactive input and the perspective-view imagery.

In Example 3, the subject matter of Example 2 optionally includes wherein the interactive path-drawing tool provides an interactive path-tracing control that draws a path based on a trajectory of a virtual projectile launched in a specified direction via the user interactive input and the perspective-view imagery.

In Example 4, the subject matter of any one or more of Examples 2-3 optionally include wherein the interactive path-drawing tool provides an interactive path-tracing control that draws a path based on a trajectory of a virtual projectile launched in a specified direction via the user interactive input and the perspective-view imagery, wherein the virtual projectile is interactive with virtual features of the virtual environment.

In Example 5, the subject matter of any one or more of Examples 1-4 optionally include providing, via the computing platform, a graphical user interface that displays a plurality of predefined path templates for selection via the user interactive input.

In Example 6, the subject matter of any one or more of Examples 1-5 optionally include providing, via the computing platform, a graphical user interface that displays a plurality of modifiable predefined path templates for selection and modification via the user interactive input.

In Example 7, the subject matter of any one or more of Examples 1-6 optionally include wherein the three-dimensional navigation path is interactive with virtual features modeled in the virtual environment.

In Example 8, the subject matter of Example 7 optionally includes wherein the three-dimensional navigation path is interactive with virtual features modeled in the virtual environment that include gravity.

In Example 9, the subject matter of any one or more of Examples 7-8 optionally include wherein the three-dimensional navigation path is interactive with virtual features modeled in the virtual environment that include solid objects.

In Example 10, the subject matter of any one or more of Examples 7-9 optionally include wherein the three-dimensional navigation path is interactive with virtual features modeled in the virtual environment that include topography.

In Example 11, the subject matter of any one or more of Examples 7-10 optionally include wherein the three-dimensional navigation path is interactive with virtual features modeled in the virtual environment that include wind.

In Example 12, the subject matter of any one or more of Examples 7-11 optionally include wherein the three-dimensional navigation path is interactive with virtual features modeled in the virtual environment by automatically conforming to a virtual surface in the virtual environment.

In Example 13, the subject matter of any one or more of Examples 1-12 optionally include interfacing with a head-mounted display device by the computing platform.

In Example 14, the subject matter of any one or more of Examples 1-13 optionally include wherein the user interactive input includes hand-gestures of a user.

In Example 15, the subject matter of any one or more of Examples 1-14 optionally include wherein the user interactive input includes head movement of a user, wherein the viewing direction is varied in response to the head movement.

In Example 16, the subject matter of any one or more of Examples 1-15 optionally include wherein the user interactive input includes hand-gestures and head movement of a user, and wherein the viewing direction is varied in response to the head movement while the interaction with the virtual environment is effected in response to the hand-gestures.

In Example 17, the subject matter of any one or more of Examples 1-16 optionally include wherein the user interactive input includes hand-gestures and head movement of a user, and wherein the viewing direction is varied in response to the head movement while the virtual movement along the three-dimensional navigation path is effected in response to the hand-gestures.

In Example 18, the subject matter of any one or more of Examples 1-17 optionally include wherein the computing platform is coupled to a first input device and to a second input device, wherein the viewing direction is varied in response to input from the first input device while the virtual movement along the three-dimensional navigation path is effected in response to input from the second input device.

In Example 19, the subject matter of any one or more of Examples 1-18 optionally include wherein during the virtual movement along the three-dimensional navigation path, the three-dimensional navigation path remains fixed in its shape and position in the virtual environment.

In Example 20, the subject matter of any one or more of Examples 1-19 optionally include wherein updating the modeling to effect the virtual movement along the three-dimensional navigation path includes jumping from a first predefined three-dimensional navigation path to a second predefined three-dimensional navigation path in response to the user interactive input.

In Example 21, the subject matter of any one or more of Examples 1-20 optionally include wherein during the virtual movement along the three-dimensional navigation path, the three-dimensional navigation path remains fixed in its shape and position in the virtual environment while the virtual movement is variable in response to the user interactive input.

In Example 22, the subject matter of any one or more of Examples 1-21 optionally include varying the virtual movement along the three-dimensional navigation path according to one-dimensional control in response to the user interactive input.

In Example 23, the subject matter of any one or more of Examples 1-22 optionally include wherein the user interactive input includes hand-gestures of a user; and wherein the method further comprises: modeling at least one portion of a user in the virtual environment to produce at least one avatar, wherein the at least one avatar is interactive with virtual objects in the virtual environment and is movable in the virtual environment in response to the user interactive input; and distorting a shape of the at least one avatar in response to the user interactive input.

In Example 24, the subject matter of Example 23 optionally includes distorting the shape of at least one virtual limb by extending a length of the at least one virtual limb.

In Example 25, the subject matter of any one or more of Examples 23-24 optionally include facilitating interactive use of the at least one avatar via the user interactive input to effect formation of the three-dimensional navigation path.

In Example 26, the subject matter of any one or more of Examples 23-25 optionally include facilitating interactive use of the at least one avatar via the user interactive input to effect interaction with virtual objects in the virtual environment.

Example 27 is a virtual-reality user-interface system, comprising: a computing platform including processing hardware, a display output interface, and a user-input interface, the computing platform configured to implement: a modeling engine to model a three-dimensional virtual environment; a graphical rendering engine operatively coupled o the modeling engine, the graphical rendering engine to render perspective-view imagery of portions of the virtual environment for display on a display device via the display output interface; an input engine operatively coupled to the modeling engine, the input engine to accept user interactive input via the user-input interface; an environment interaction engine operatively coupled to the input engine and to the modeling engine, the environment interaction engine to effect interaction with the virtual environment via the user interactive input; a path-definition engine operatively coupled to the input engine, the path-definition engine to form an a priori three-dimensional navigation path in the virtual environment based on the user interactive input interactive with the perspective-view imagery; and a path-traversal engine operatively coupled to the path-definition engine, the path-traversal engine to effect virtual movement along the three-dimensional navigation path while concurrently varying viewing direction of the perspective-view imagery based on the user interactive input.

In Example 28, the subject matter of Example 27 optionally includes wherein the path-definition engine includes a graphical user interface engine that facilitates an interactive path-drawing tool via the user interactive input and the perspective-view imagery.

In Example 29, the subject matter of Example 28 optionally includes wherein the interactive path-drawing tool provides an interactive path-tracing control that draws a path based on a trajectory of a virtual projectile launched in a specified direction via the user interactive input and the perspective-view imagery.

In Example 30, the subject matter of any one or more of Examples 28-29 optionally include wherein the interactive path-drawing tool provides an interactive path-tracing control that draws a path based on a trajectory of a virtual projectile launched in a specified direction via the user interactive input and the perspective-view imagery, wherein the virtual projectile is interactive with virtual features of the virtual environment.

In Example 31, the subject matter of any one or more of Examples 27-30 optionally include wherein the path-definition engine includes a graphical user interface engine that provides a plurality of predefined path templates for selection via the user interactive input.

In Example 32, the subject matter of any one or more of Examples 27-31 optionally include wherein the path-definition engine includes a graphical user interface engine that provides a plurality of modifiable predefined path templates for selection and modification via the user interactive input.

In Example 33, the subject matter of any one or more of Examples 27-32 optionally include wherein the three-dimensional navigation path is interactive with virtual features modeled in the virtual environment.

In Example 34, the subject matter of Example 33 optionally includes wherein the three-dimensional navigation path is interactive with virtual features modeled in the virtual environment that include gravity.

In Example 35, the subject matter of any one or more of Examples 33-34 optionally include wherein the three-dimensional navigation path is interactive with virtual features modeled in the virtual environment that include solid objects.

In Example 36, the subject matter of any one or more of Examples 33-35 optionally include wherein the three-dimensional navigation path is interactive with virtual features modeled in the virtual environment that include topography.

In Example 37, the subject matter of any one or more of Examples 33-36 optionally include wherein the three-dimensional navigation path is interactive with virtual features modeled in the virtual environment that include wind.

In Example 38, the subject matter of any one or more of Examples 33-37 optionally include wherein the three-dimensional navigation path is interactive with virtual features modeled in the virtual environment by automatically conforming to a virtual surface in the virtual environment.

In Example 39, the subject matter of any one or more of Examples 27-38 optionally include a head-mounted display device interfaced via the display output interface.

In Example 40, the subject matter of any one or more of Examples 27-39 optionally include wherein the user-input interface is coupled to a hand-motion detector, and wherein the user interactive input includes hand-gestures of a user.

In Example 41, the subject matter of any one or more of Examples 27-40 optionally include wherein the user-input interface is coupled to a head-motion detector, and wherein the user interactive input includes head movement of a user, wherein the viewing direction is varied in response to the head movement.

In Example 42, the subject matter of any one or more of Examples 27-41 optionally include wherein the user-input interface is coupled to a hand-motion detector, and to a head-motion detector, wherein the user interactive input includes hand-gestures and head movement of a user, and wherein the viewing direction is varied in response to the head movement while the interaction with the virtual environment is effected in response to the hand-gestures.

In Example 43, the subject matter of any one or more of Examples 27-42 optionally include wherein the user-input interface is coupled to a hand-motion detector, and to a head-motion detector, wherein the user interactive input includes hand-gestures and head movement of a user, and wherein the viewing direction is varied in response to the head movement while the virtual movement along the three-dimensional navigation path is effected in response to the hand-gestures.

In Example 44, the subject matter of any one or more of Examples 27-43 optionally include wherein the user-input interface is coupled to a first input device and to a second input device, wherein the viewing direction is varied in response to input from the first input device while the virtual movement along the three-dimensional navigation path is effected in response to input from the second input device.

In Example 45, the subject matter of any one or more of Examples 27-44 optionally include wherein during the virtual movement along the three-dimensional navigation path, the three-dimensional navigation path remains fixed in its shape and position in the virtual environment.

In Example 46, the subject matter of Example 45 optionally includes wherein the path-traversal engine facilitates jumping from a first predefined three-dimensional navigation path to a second predefined three-dimensional navigation path in response to the user interactive input.

In Example 47, the subject matter of any one or more of Examples 27-46 optionally include wherein during the virtual movement along the three-dimensional navigation path, the three-dimensional navigation path remains fixed in its shape and position in the virtual environment while the virtual movement is variable in response to the user interactive input.

In Example 48, the subject matter of any one or more of Examples 27-47 optionally include wherein the path-traversal engine facilitates variability of the virtual movement along the three-dimensional navigation path according to one-dimensional control in response to the user interactive input.

In Example 49, the subject matter of any one or more of Examples 27-48 optionally include wherein the user-input interface is coupled to a hand-motion detector and wherein the user interactive input includes hand-gestures of a user; and wherein the computing processing hardware contains instructions that, when executed, cause the computing platform to further implement: an avatar augmentation engine to model at least one portion of a user in the virtual environment to produce at least one avatar, wherein the at least one avatar is interactive with virtual objects in the virtual environment and is movable in the virtual environment in response to the user interactive input, and wherein the avatar augmentation engine is to distort a shape of the at least one avatar in response to the user interactive input.

In Example 50, the subject matter of Example 49 optionally includes wherein the avatar augmentation engine is to distort the shape of at least one virtual limb by extending a length of the at least one virtual limb.

In Example 51, the subject matter of any one or more of Examples 49-50 optionally include wherein the avatar augmentation engine is a part of the path-definition engine, and wherein the avatar augmentation engine provides the at least one avatar as a tool for forming the three-dimensional navigation path.

In Example 52, the subject matter of any one or more of Examples 49-51 optionally include wherein the avatar augmentation engine operates in conjunction with the environment interaction engine, and wherein the avatar augmentation engine provides at least one virtual limb as a tool for interacting with virtual objects in the virtual environment.

Example 53 is a system for providing virtual-reality navigation controls utilizing a computing platform, the system comprising: means for modeling a three-dimensional virtual environment; means for rendering perspective-view imagery of portions of the virtual environment for display on a display device; means for reading user interactive input; means for updating the modeling to effect interaction with the virtual environment via the user interactive input; means for forming an a priori three-dimensional navigation path in the virtual environment based on the user interactive input interactive with the perspective-view imagery; and means for updating the modeling to effect virtual movement along the three-dimensional navigation path while concurrently varying viewing direction of the perspective-view imagery based on the user interactive input.

In Example 54, the subject matter of Example 53 optionally includes means for providing an interactive path-drawing tool via the user interactive input and the perspective-view imagery.

In Example 55, the subject matter of Example 54 optionally includes wherein the interactive path-drawing tool provides an interactive path-tracing control that draws a path based on a trajectory of a virtual projectile launched in a specified direction via the user interactive input and the perspective-view imagery.

In Example 56, the subject matter of any one or more of Examples 54-55 optionally include wherein the interactive path-drawing tool provides an interactive path-tracing control that draws a path based on a trajectory of a virtual projectile launched in a specified direction via the user interactive input and the perspective-view imagery, wherein the virtual projectile is interactive with virtual features of the virtual environment.

In Example 57, the subject matter of any one or more of Examples 53-56 optionally include means for providing a graphical user interface that displays a plurality of pre-defined path templates for selection via the user interactive input.

In Example 58, the subject matter of any one or more of Examples 53-57 optionally include means for providing a graphical user interface that displays a plurality of modifiable predefined path templates for selection and modification via the user interactive input.

In Example 59, the subject matter of any one or more of Examples 53-58 optionally include wherein the three-dimensional navigation path is interactive with virtual features modeled in the virtual environment.

In Example 60, the subject matter of Example 59 optionally includes wherein the three-dimensional navigation path is interactive with virtual features modeled in the virtual environment that include gravity.

In Example 61, the subject matter of any one or more of Examples 59-60 optionally include wherein the three-dimensional navigation path is interactive with virtual features modeled in the virtual environment that include solid objects.

In Example 62, the subject matter of any one or more of Examples 59-61 optionally include wherein the three-dimensional navigation path is interactive with virtual features modeled in the virtual environment that include topography.

In Example 63, the subject matter of any one or more of Examples 59-62 optionally include wherein the three-dimensional navigation path is interactive with virtual features modeled in the virtual environment that include wind.

In Example 64, the subject matter of any one or more of Examples 59-63 optionally include wherein the three-dimensional navigation path is interactive with virtual features modeled in the virtual environment by automatically conforming to a virtual surface in the virtual environment.

In Example 65, the subject matter of any one or more of Examples 53-64 optionally include means for interfacing with a head-mounted display device.

In Example 66, the subject matter of any one or more of Examples 53-65 optionally include wherein the user interactive input includes hand-gestures of a user.

In Example 67, the subject matter of any one or more of Examples 53-66 optionally include wherein the user interactive input includes head movement of a user, wherein the viewing direction is varied in response to the head movement.

In Example 68, the subject matter of any one or more of Examples 53-67 optionally include wherein the user interactive input includes hand-gestures and head movement of a user, and wherein the viewing direction is varied in response to the head movement while the interaction with the virtual environment is effected in response to the hand-gestures.

In Example 69, the subject matter of any one or more of Examples 53-68 optionally include wherein the user interactive input includes hand-gestures and head movement of a user, and wherein the viewing direction is varied in response to the head movement while the virtual movement along the three-dimensional navigation path is effected in response to the hand-gestures.

In Example 70, the subject matter of any one or more of Examples 53-69 optionally include wherein the computing platform is coupled to a first input device and to a second input device, wherein the viewing direction is varied in response to input from the first input device while the virtual movement along the three-dimensional navigation path is effected in response to input from the second input device.

In Example 71, the subject matter of any one or more of Examples 53-70 optionally include wherein during the virtual movement along the three-dimensional navigation path, the three-dimensional navigation path remains fixed in its shape and position in the virtual environment.

In Example 72, the subject matter of Example 71 optionally includes wherein the means for updating the modeling to effect the virtual movement along the three-dimensional navigation path includes means for jumping from a first predefined three-dimensional navigation path to a second predefined three-dimensional navigation path in response to the user interactive input.

In Example 73, the subject matter of any one or more of Examples 53-72 optionally include wherein during the virtual movement along the three-dimensional navigation path, the three-dimensional navigation path remains fixed in its shape and position in the virtual environment while the virtual movement is variable in response to the user interactive input.

In Example 74, the subject matter of any one or more of Examples 53-73 optionally include means for varying the virtual movement along the three-dimensional navigation path according to one-dimensional control in response to the user interactive input.

In Example 75, the subject matter of any one or more of Examples 53-74 optionally include wherein the user interactive input includes hand-gestures of a user; and wherein the system further comprises: means for modeling at least one portion of a user in the virtual environment to produce at least one avatar, wherein the at least one avatar is interactive with virtual objects in the virtual environment and is movable in the virtual environment in response to the user interactive input; and means for distorting a shape of the at least one avatar in response to the user interactive input.

In Example 76, the subject matter of Example 75 optionally includes means for distorting the shape of at least one virtual limb by extending a length of the at least one virtual limb.

In Example 77, the subject matter of any one or more of Examples 75-76 optionally include means for facilitating interactive use of the at least one avatar via the user interactive input to effect formation of the three-dimensional navigation path.

In Example 78, the subject matter of any one or more of Examples 75-77 optionally include means for facilitating interactive use of the at least one avatar via the user interactive input to effect interaction with virtual objects in the virtual environment.

Example 79 is at least one computer-readable medium containing instructions that, when executed, by a computing platform, cause the computing platform to perform the method according to any one of Examples 1-26.

Example 80 is a system for providing virtual-reality navigation controls utilizing a computing platform, the system comprising means for carrying out the method according to any one of Examples 1-26.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for providing virtual-reality navigation controls utilizing a computing platform, the method comprising:
    modeling, by the computing platform, a virtual environment;
    rendering, by the computing platform, perspective-view imagery of portions of the virtual environment for display on a display device;
    reading, by the computing platform, user interactive input (UII), including path-definition UII that defines an a-priori three-dimensional navigation path via user interaction with the virtual environment, path-traversal UII, subsequent to the path-definition UUI, that controls real-time-variable virtual movement along the a-priori three-dimensional navigation path via user interaction with the virtual environment, and view-direction control UII, subsequent to the path-definition UUI, that controls real-time-variable perspective-viewing direction from a current position along the a-priori three-dimensional navigation path via user interaction with the virtual environment;
    updating the modeling, by the computing platform, to effect interaction with the virtual environment via the UII;
    forming, by the computing platform, the a-priori three-dimensional navigation path in the virtual environment based on the path-definition UII interactive with the perspective-view imagery; and
    updating the modeling, by the computing platform, to effect virtual movement along the formed a-priori three-dimensional navigation path in response to the path-traversal UII while concurrently varying viewing direction of the perspective-view imagery in response to the view-direction control UII.

2. The method of claim 1, further comprising: providing, via the computing platform, an interactive path-drawing tool via the user interactive input and the perspective-view imagery to gather the path-definition UII.

3. The method of claim 2, wherein the interactive path-drawing tool provides an interactive path-tracing control that draws a path based on a trajectory of a virtual projectile launched in a specified direction via the user interactive input and the perspective-view imagery.

4. The method of claim 2, wherein the interactive path-drawing tool provides an interactive path-tracing control that draws a path based on a trajectory of a virtual projectile launched in a specified direction via the user interactive input and the perspective-view imagery, wherein the virtual projectile is interactive with virtual features of the virtual environment.

5. The method of claim 1, wherein the user interactive input includes hand-gestures of a user; and wherein the method further comprises: modeling at least one portion of a user in the virtual environment to produce at least one avatar, wherein the at least one avatar is interactive with virtual objects in the virtual environment and is movable in the virtual environment in response to the user interactive input; and distorting a shape of the at least one avatar in response to the user interactive input.

6. A virtual-reality user-interface system, comprising:
    a computing platform including processing hardware, a display output interface, and a user input interface, the computing platform configured to implement:
    a modeling engine to model a virtual environment;
    a graphical rendering engine operatively coupled to the modeling engine, the graphical rendering engine to render perspective-view imagery of portions of the virtual environment for display on a display device via the display output interface;

an input engine operatively coupled to the modeling engine, the input engine to accept user interactive input (UII), including path-definition UII that defines an a-priori three-dimensional navigation path via user interaction with the virtual environment, path-traversal UII, subsequent to the path-definition UUI, that controls real-time-variable virtual movement along the a-priori three-dimensional navigation path via user interaction with the virtual environment, and view-direction control UII, subsequent to the path-definition UUI, that controls real-time-variable perspective-viewing direction from a current position along the a-priori three-dimensional navigation path via user interaction with the virtual environment;

an environment interaction engine operatively coupled to the input engine and to the modeling engine, the environment interaction engine to effect interaction with the virtual environment via the user interactive input;

a path-definition engine operatively coupled to the input engine, the path-definition engine to form the a priori three-dimensional navigation path in the virtual environment based on the path-definition UII interactive with the perspective-view imagery; and a path-traversal engine operatively coupled to the path-definition engine, the path-traversal engine to effect virtual movement along the formed a-priori three-dimensional navigation path in response to the path-traversal UII, while concurrently varying viewing direction of the perspective-view imagery in response to the view-direction control UII.

7. The system of claim 6, wherein the path-definition engine includes a graphical user interface engine that facilitates an interactive path-drawing tool via the user interactive input and the perspective-view imagery to gather the path-definition UII.

8. The system of claim 7, wherein the interactive path-drawing tool provides an interactive path-tracing control that draws a path based on a trajectory of a virtual projectile launched in a specified direction via the user interactive input and the perspective-view imagery.

9. The system of claim 6, wherein the path-definition engine includes a graphical user interface engine that provides a plurality of modifiable predefined path templates for selection and modification via the user interactive input to gather the path-definition UII.

10. The system of claim 6, wherein the a-priori three-dimensional navigation path is interactive with virtual features modeled in the virtual environment.

11. The system of claim 6, wherein during the virtual movement along the a-priori three-dimensional navigation path, the a-priori three-dimensional navigation path remains fixed in its shape and position in the virtual environment while the virtual movement is variable in response to the path-traversal UII.

12. The system of claim 6, wherein the path-traversal engine facilitates variability of the virtual movement along the a-priori three-dimensional navigation path according to one-dimensional control in response to the path-traversal UII.

13. The system of claim 6, wherein the user-input interface is coupled to a hand-motion detector and wherein the user interactive input includes hand-gestures of a user; and wherein the computing processing hardware contains instructions that, when executed, cause the computing platform to further implement:

an avatar augmentation engine to model at least one portion of a user in the virtual environment to produce at least one avatar, wherein the at least one avatar is interactive with virtual objects in the virtual environment and is movable in the virtual environment in response to the user interactive input, and wherein the avatar augmentation engine is to distort a shape of the at least one avatar in response to the user interactive input.

14. The system of claim 13, wherein the avatar augmentation engine is to distort the shape of at least one virtual limb by extending a length of the at least one virtual limb.

15. The system of claim 13, wherein the avatar augmentation engine is a part of the path-definition engine, and wherein the avatar augmentation engine provides the at least one avatar as a tool for forming the a-priori three-dimensional navigation path as part of the path-definition UII.

16. At least one non-transitory computer-readable medium containing instructions that, when executed, by a computing platform, cause the computing platform to:

model a virtual environment;

render perspective-view imagery of portions of the virtual environment for display on a display device;

read user interactive input (UII), including path-definition UII that defines an a-priori three-dimensional navigation path via user interaction with the virtual environment, path-traversal UII, subsequent to the path-definition UUI, that controls real-time-variable virtual movement along the a-priori three-dimensional navigation path via user interaction with the virtual environment, and view-direction control UII, subsequent to the path-definition UUI, that controls real-time-variable perspective-viewing direction from a current position along the a-priori three-dimensional navigation path via user interaction with the virtual environment;

effect interaction with the virtual environment via the user interactive input;

form an a priori three-dimensional navigation path in the virtual environment based on the path-definition UII interactive with the perspective-view imagery; and effect virtual movement along the formed a-priori three-dimensional navigation path in response to the path-traversal UII while concurrently varying viewing direction of the perspective-view imagery in response to the view-direction control UII.

17. The at least one computer-readable medium of claim 16, further comprising instructions that, when executed, cause the computing platform to implement an interactive path-drawing tool via the user interactive input and the perspective-view imagery to gather the path-definition UII.

18. The at least one computer-readable medium of claim 17, wherein the interactive path-drawing tool provides an interactive path-tracing control that draws a path based on a trajectory of a virtual projectile launched in a specified direction via the user interactive input and the perspective-view imagery.

19. The at least one computer-readable medium of claim 17, wherein the interactive path-drawing tool provides an interactive path-tracing control that draws a path based on a trajectory of a virtual projectile launched in a specified direction via the user interactive input and the perspective-view imagery, wherein the virtual projectile is interactive with virtual features of the virtual environment.

20. The at least one computer-readable medium of claim 16, further comprising instructions that, when executed, cause the computing platform to implement a graphical user interface that displays a plurality of predefined path templates for selection via the user interactive input to gather the path-definition UII.

21. The at least one computer-readable medium of claim 16, further comprising instructions that, when executed, cause the computing platform to implement a graphical user interface that displays a plurality of modifiable predefined path templates for selection and modification via the user interactive input to gather the path-definition UII.

22. The at least one computer-readable medium of claim 16, wherein during the virtual movement along the a-priori three-dimensional navigation path, the a-priori three-dimensional navigation path remains fixed in its shape and position in the virtual environment.

23. The at least one computer-readable medium of claim 22, wherein the instructions to effect the virtual movement along the a-priori three-dimensional navigation path include instructions for jumping from a first predefined three-dimensional navigation path to a second predefined three-dimensional navigation path in response to the path-traversal UII.

24. The at least one computer-readable medium of claim 16, further comprising instructions for varying the virtual movement along the a-priori three-dimensional navigation path according to one-dimensional control in response to the path-traversal UII.

25. The at least one computer-readable medium of claim 16, wherein the user interactive input includes hand-gestures of a user; and wherein the instructions are further to:
  model at least one portion of a user in the virtual environment to produce at least one avatar, wherein the at least one avatar is interactive with virtual objects in the virtual environment and is movable in the virtual environment in response to the user interactive input; and
  distort a shape of the at least one avatar in response to the user interactive input.

\* \* \* \* \*